United States Patent
Heisterkamp

(10) Patent No.: US 9,315,196 B2
(45) Date of Patent: Apr. 19, 2016

(54) METHOD, DEVICE AND COMPUTER PROGRAM PRODUCT FOR CONTROLLING A FUNCTIONAL UNIT OF A VEHICLE

(75) Inventor: Paul Heisterkamp, Erbach (DE)

(73) Assignee: Daimler AG, Stuttgart (DE)

( * ) Notice: Subject to any disclaimer, the term of this patent is extended or adjusted under 35 U.S.C. 154(b) by 168 days.

(21) Appl. No.: 13/822,048

(22) PCT Filed: Dec. 7, 2011

(86) PCT No.: PCT/EP2011/006118
§ 371 (c)(1),
(2), (4) Date: Sep. 19, 2013

(87) PCT Pub. No.: WO2012/107066
PCT Pub. Date: Aug. 16, 2012

(65) Prior Publication Data
US 2014/0005857 A1    Jan. 2, 2014

(30) Foreign Application Priority Data

Feb. 8, 2011 (DE) .................... 10 2011 010 594

(51) Int. Cl.
*B60W 50/08* (2012.01)
*G06F 3/01* (2006.01)
*B60W 50/10* (2012.01)
*G06K 9/00* (2006.01)

(52) U.S. Cl.
CPC ............. *B60W 50/08* (2013.01); *G06F 3/017* (2013.01); *B60K 2350/1052* (2013.01); *B60W 50/10* (2013.01); *G06K 9/00355* (2013.01)

(58) Field of Classification Search
CPC ............... B60W 50/08; B60W 50/10; B60K 2350/1052; G06F 9/00355; G06F 3/017
USPC ........................................................ 701/36
See application file for complete search history.

(56) References Cited

U.S. PATENT DOCUMENTS

| | | | | |
|---|---|---|---|---|
| 8,605,011 | B2 * | 12/2013 | Seder et al. | 345/9 |
| 8,924,150 | B2 * | 12/2014 | Tsimhoni et al. | 701/454 |
| 2008/0236275 | A1 | 10/2008 | Breed et al. | |
| 2009/0210110 | A1 | 8/2009 | Dybalski et al. | |
| 2010/0185341 | A1 | 7/2010 | Wilson et al. | |
| 2012/0274549 | A1 | 11/2012 | Wehling et al. | |

FOREIGN PATENT DOCUMENTS

DE    10 2009 032 069 A1    1/2011

OTHER PUBLICATIONS

International Search Report with English translation dated Mar. 29, 2012 (four (4) pages).
German-language Written Opinion (PCT/ISA/237) (six (6) pages).

* cited by examiner

Primary Examiner — Richard Camby
(74) Attorney, Agent, or Firm — Crowell & Moring LLP

(57) ABSTRACT

A method for controlling a functional unit of a vehicle involves detecting a gesture of a vehicle passenger and controlling the functional unit depending on the detected gesture, if a first predetermined condition is fulfilled. The first predetermined condition is that a movement sequence of a detected gesture coincides with a predetermined movement pattern that is similar to a movement of a functional unit to be controlled or is analogous to a manipulation of the functional unit to be controlled.

10 Claims, 4 Drawing Sheets

METHOD, DEVICE AND COMPUTER PROGRAM PRODUCT FOR CONTROLLING A FUNCTIONAL UNIT OF A VEHICLE

BACKGROUND AND SUMMARY OF THE INVENTION

Exemplary embodiments of the present invention relate to a method, a device and a computer program product for controlling a functional unit of a vehicle depending on a detected gesture of a vehicle passenger.

Modern motor vehicles have a plurality of control elements, which are, for example, arranged on the dashboard or in the center console. These control elements are used to control or set the functional units of the vehicle, such as the windows, the sunroof and the exterior mirrors. These plural control elements are confusing for a user or vehicle passenger and they also result in large costs for the vehicle manufacturer.

A method and a device for activating various vehicle conditions depending on detecting a gesture are known from U.S. Patent Publication US 2010/0185341 A1. One or several spaces in a vehicle are monitored. If a predetermined gesture is detected within a space, then this is used to control a vehicle condition.

It is disadvantageous that such gestures are predetermined and must be memorized by the respective user, i.e. in this case the vehicle passenger. In gesture recognition, usually random, arbitrary signals are defined, which are carried out by the user and detected by a detecting means.

Exemplary embodiments of the present invention are directed to a method and a device for controlling at least one functional unit of a vehicle and a corresponding computer program product, which enable gesture-based control of functional units in a vehicle in a manner that is reliable and intuitive for the user.

According to one aspect of the present invention, a method for controlling a functional unit of a vehicle is provided, comprising detecting a gesture of a vehicle passenger and controlling a functional unit depending on the detected gesture if a predetermined first condition is fulfilled, wherein the first predetermined condition is that a movement sequence of a detected gesture coincides with a predetermined movement pattern, which is similar to a movement of a functional unit to be controlled or is analogous to a manipulation of the functional unit to be controlled.

According to a modification of the present invention, the method comprises selecting a functional unit to be controlled before controlling the functional unit to be controlled, by detecting orientation of a head of the vehicle passenger or direction of gaze of the vehicle passenger.

According to a further modification of the present invention, the method comprises generating a first predetermined processing signal in response to a first predetermined speech input of the vehicle passenger, if a second predetermined condition is fulfilled, and stopping or reversing controlling the functional unit to be controlled in response to the first predetermined processing signal.

According to a further modification of the present invention, the second predetermined condition is that recognition reliability of the detected gesture is above a first predetermined threshold.

According to a further modification of the present invention, the method comprises informing the vehicle passenger of a functional unit to be controlled after selecting and before controlling the functional unit to be controlled, if a third predetermined condition is fulfilled, generating a second predetermined processing signal in response to a second predetermined speech input of a vehicle passenger after informing the vehicle passenger, and stopping or reversing controlling the functional unit to be controlled in response to the second predetermined processing signal.

According to a further modification of the present invention, the third predetermined condition is that the recognition reliability of the detected gesture is below the first predetermined threshold and above the second predetermined threshold, which is smaller than the first predetermined threshold.

According to a further modification of the present invention, the method comprises informing the vehicle passenger of a functional unit to be controlled after selecting and before controlling the functional unit to be controlled, if a fourth predetermined condition is fulfilled, generating a third predetermined processing signal in response to a third predetermined speech input of a vehicle passenger after informing the vehicle passenger, and performing controlling the functional unit to be controlled in response to the third predetermined processing signal.

According to a further modification of the present invention, the fourth predetermined condition is that recognition reliability of the detected gesture is below a third predetermined threshold, which is smaller than or equal to the second predetermined threshold.

According to a further aspect of the present invention, a device for controlling a functional unit of a vehicle is provided, comprising means adapted to perform the method mentioned previously.

According to a further aspect of the present invention, a computer program product is provided which, in cooperation with a computer or a computer network, is adapted to perform directly or, after performing a predetermined routine, indirectly the method mentioned previously.

The gesture mentioned previously is preferably a gesture carried out with a hand or arm of a vehicle passenger. The gestures can be carried out by a particular vehicle passenger, by several vehicle passengers or by all vehicle passengers. Different gesture-based operating possibilities can be allowed for different vehicle passengers. Detecting gestures of different vehicle passengers can be performed in parallel to each other or successively.

By a combination of gesture recognition, speech input and feedback to the vehicle passenger, accuracy of gesture recognition is increased by adaptation of parameters, and therefore gesture recognition is be improved in the course of time.

Hereinafter, the present invention will be described in more detail on the basis of embodiments, with reference to the attached drawing, in which the same or similar parts are designated with same reference numerals.

BRIEF DESCRIPTION OF THE DRAWING FIGURES

DETAILED DESCRIPTION

Before embodiments of the present invention are described in detail, an assembly that is used in all embodiments described below is described.

Figure 1:
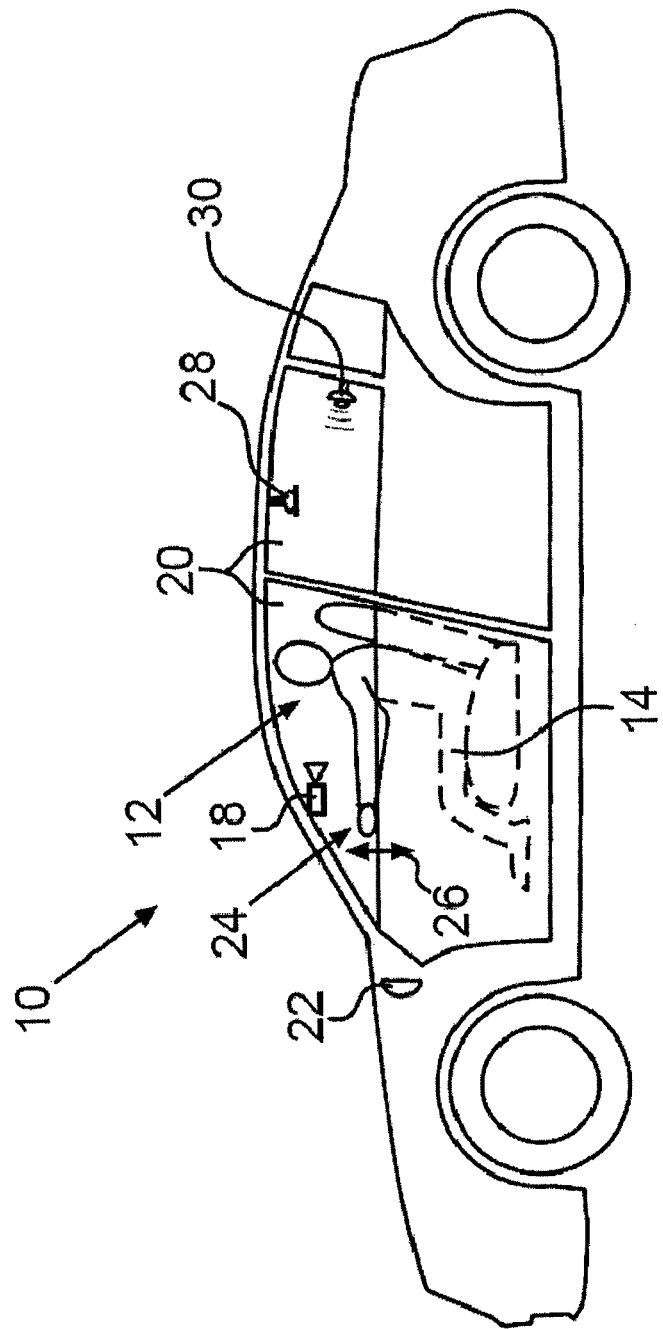
FIG. 1 is a schematic side view of a vehicle.

FIG. 1 shows a schematic side view of a vehicle.

In FIG. 1, reference numeral 10 designates a vehicle, reference numeral 12 designates a passenger compartment of the vehicle 10, reference numeral 14 designates a vehicle passenger, reference numeral 16 indicates a driver seat of the vehicle 10, reference numeral 18 designates a detecting means, reference numeral 20 designates windows of the vehicle 10, reference numeral 22 designates exterior mirrors of the vehicle 10, reference numeral 24 designates a hand of the vehicle passenger 14, reference numeral 26 designates an arrow of movement that symbolizes a gesture carried out by the hand 24 of the vehicle passenger, reference numeral 28 designates a microphone and reference numeral 30 designates a loudspeaker.

As shown in FIG. 1, the vehicle passenger 14 is on the driver seat 16 of the vehicle 20.

A gesture of the vehicle passenger 14 is detected within the passenger compartment 12 of the vehicle 10. Detecting the gesture is performed by the detecting means 18. The detecting means 18 can, for example, be one that is used for games consoles and allows for three-dimensional detection of gestures, or an appropriate video camera that detects a gesture of the vehicle passenger 14. The variable light conditions within the passenger compartment 12 of the vehicle 10 can be compensated for by at least partially shifting the recorded frequency band into the infrared range. For this, an additional infrared illumination can be used if needed. It is likewise conceivable for the gestures of the vehicle passenger 14 to be detected by an appropriate movement sensor system, or to use capacitive sensors, by which gestures or movements of the vehicle passenger 14 can be detected.

The movement sequence of a gesture of the vehicle passenger 14 that serves to control a functional unit coincides with a movement pattern that is similar to the movement of the functional unit be to controlled or set, or which is analogous to a manipulation of the functional unit to be controlled. The vehicle passenger 14 carries out a so-called iconic gesture, which is detected by the detecting means 18. To this end, appropriate movement patterns can be stored in a data memory in an evaluation means not shown. These movement patterns are compared to the movement sequence of the gesture carried out, e.g. using an image processing program.

Depending on a gesture, a functional unit of the vehicle 10 is set with a control or setting means not represented here. Examples of a functional unit in the vehicle are the windows 20, the exterior mirrors 22, a sunroof (not shown here) having a sunscreen or the like. Actuators that are already present in the vehicle 10, by which the functional units are controlled or set, can be used as control or setting means.

The corresponding gesture is carried out e.g. by the hand 24 or the arm of the vehicle passenger 14. Movement of the hand 24 is illustrated in the figure by an arrow of movement 26. In addition, a gesture can be made by movement of any other of the body parts vehicle passenger 14.

Hereinafter, a description of a first embodiment of the present invention is given.

Figure 2:
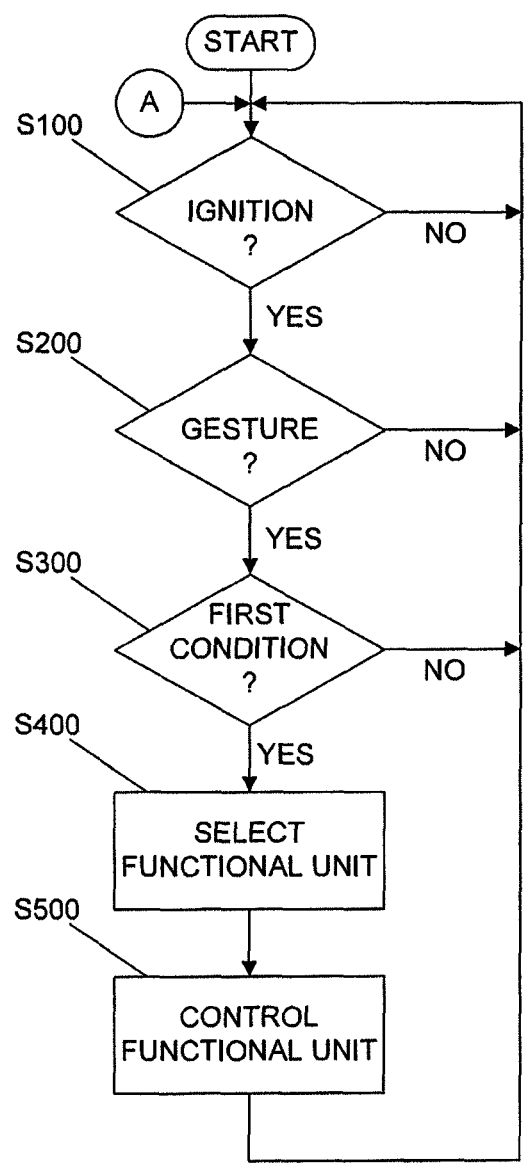
FIG. 2 is a flow chart of a process flow according to a first embodiment of the present invention.

FIG. 2 shows a flow chart of a process flow according to the first embodiment of the present invention.

At a step S100, a check is made as to whether or not ignition of the vehicle 10 has been switched on. If the decision at step S100 is NO, then the process flow returns to step S100.

If the decision at step S100 is YES, then the process proceeds to a step S200, in which it is checked whether or not a gesture has been made by the vehicle passenger 14. If the decision at step S200 is NO, then the process returns to step S200.

If the decision at step S200 is YES, then the process flow proceeds to step S300. At step S300, it is checked whether or not the gesture made by the vehicle passenger 14 fulfills a first predetermined condition. In more detail, the first predetermined condition is fulfilled if the gesture made by the vehicle passenger 14 has a movement sequence that coincides with a movement pattern that is similar to a movement of a functional unit to be controlled or is analogous to a manipulation of the functional unit to be controlled. Such movement patterns are stored in advance in the data memory described above, and the decision at step S300 is carried out by the evaluation means described above by comparing the movement sequence of the gesture made by the vehicle passenger 14 and the movement pattern stored in advance in the data memory.

If the decision at step S300 is NO, i.e. the gesture made by the vehicle passenger 14 has a movement sequence that neither coincides with a movement pattern that is similar to a movement of a functional unit to be controlled, nor is analogous to a manipulation of the functional unit to be controlled, then the method sequence returns to step S100.

If the decision at step S300 is YES, i.e. the gesture made by the vehicle passenger 14 has a movement sequence that coincides with a movement pattern that is similar to a movement of a functional unit to be controlled, or is analogous to a manipulation of the functional unit to be controlled, then the method sequence proceeds to step S400.

At step S400, a functional unit to be controlled is selected on the basis of the gesture made by the vehicle passenger 14. In subsequent step S500, the functional unit selected at step S500 is controlled. After step S500, the process flow returns to step S100.

Hereinafter, description of examples of controlling functional units in the vehicle 10 depending on the gesture made by the vehicle passenger 14 in the manner described previously with reference to FIG. 1 is given.

If the vehicle passenger 14 wants to open one of the windows 20, for example, this can be achieved by the vehicle passenger 14 by first positioning his arm such that the outstretched, flat hand 24 is approximately at eye level of the vehicle passenger 14, with palm facing downwards. Thereafter, a downwards movement is made by the arm. As a consequence of the downwards movement, the window 20 is opened. The vehicle passenger 14 can choose whether the driver-side or passenger-side window is opened, depending on whether he carries out the gesture with the hand on the side of the driver-side window or the hand on side of the passenger-side window.

The window 20 can likewise be closed again by an appropriate gesture. This can be done, for example, with an upwards movement of the arm and the outstretched hand 24, in this case the palm of hand is facing upwards, starting with the hand at approximately chest height. If this upwards movement of the arms is stopped, then the movement of the window 20 is also stopped. For example, the two front windows 20 of the vehicle 10 can be lowered by moving a flat hand 24 on a bent arm in the middle of the vehicle downwards.

A sunroof (not shown) and/or a sunscreen can be opened, for example, by an appropriate wiping movement of a flat hand 24 that is angled upward and carries out a movement from front to back. The sunroof can be closed again by an appropriate wiping movement of the hand 24 that is angled upward from back to front.

The exterior mirror(s) 22 of the vehicle 10 can be folded inward, for example, by the vehicle passenger 14 carrying out a movement with the arm and/or hand 24 as if he wants to pull the mirrors 22 in. With a gesture having a movement sequence that is analogous to pushing the exterior mirrors 22 away, the exterior mirrors 22 are folded back out again. With a gripping motion with a turning of the hand 24 in a horizontal or vertical direction, the exterior mirror 22 on the side on which the hand 24 is held can be set. An alternative possibility can be used for adjusting the exterior mirror 22, for example. This is particularly suitable for people who are no longer familiar with mechanically adjusting the exterior mirror 22. It is provided that the index finger of the hand 24 carries out the kind of movement as if it were pushing on a corner of the exterior mirror 22. As a consequence of this gesture, the exterior mirror 22 is deviated in the direction of this corner. In this case, the gesture is analogous to a manipulation of the functional unit.

Hereinafter, a description of a second embodiment of the present invention is given.

Figure 3:
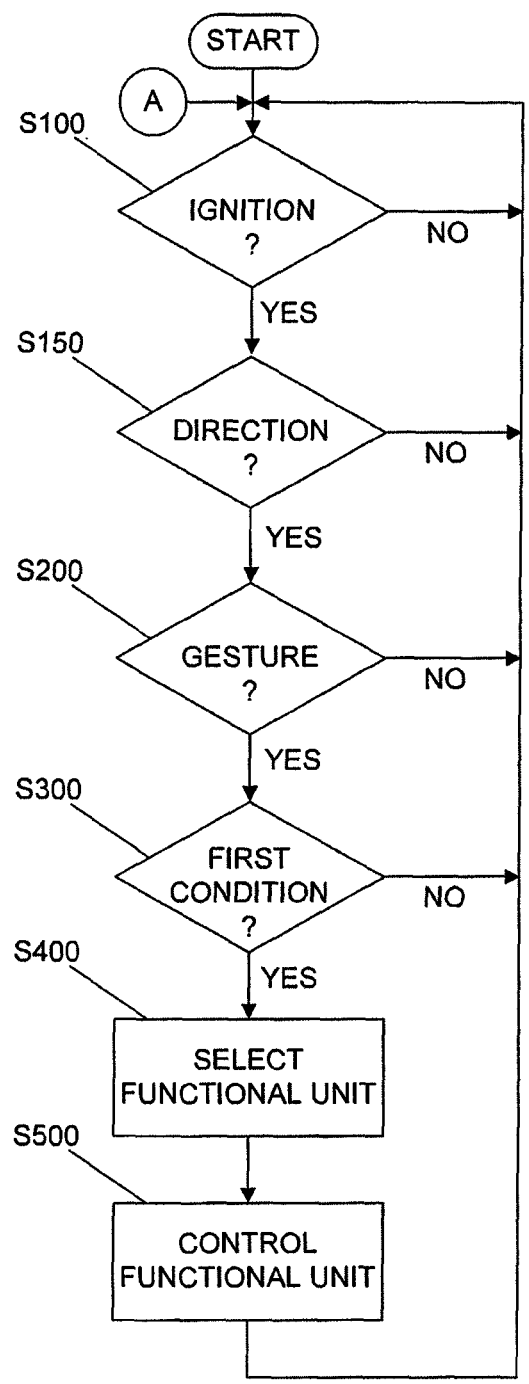
FIG. 3 is a flow chart of a process flow according to a second embodiment of the present invention.

FIG. 3 shows a flow chart of a method sequence according to the second embodiment of the present invention.

It should be noted that the second embodiment of the present invention, with the exception of the changes regarding assembly and functional principle described below, is the same as the first embodiment of the present invention described above, and so redundant description is omitted.

As is shown in FIG. 3, the process flow has, in addition to the process flow shown in FIG. 2, a step S150 that is carried out between step S100 and step S200.

At step S150 a check is made as to whether alignment of a head of the vehicle passenger 14 and/or direction of gaze of eyes of the vehicle passenger 14 is in the direction of, for example, one or several functional units. If the decision at step S150 is NO, then the process returns to step S100. If the process flow at step S100 is YES, then the process flow proceeds to step S200.

The decision at step S200 is carried out exclusively with regard to the functional unit or the functional units to which the head of the vehicle passenger 14 is aligned and/or the gaze of the vehicle passenger is aligned.

In this way, the recognition reliability of the method can be increased. The alignment of the head and/or the direction of gaze can be detected by the detecting means 18 or by a separate detecting means.

Hereinafter, a description of a third embodiment of the present invention is given.

Figure 4:
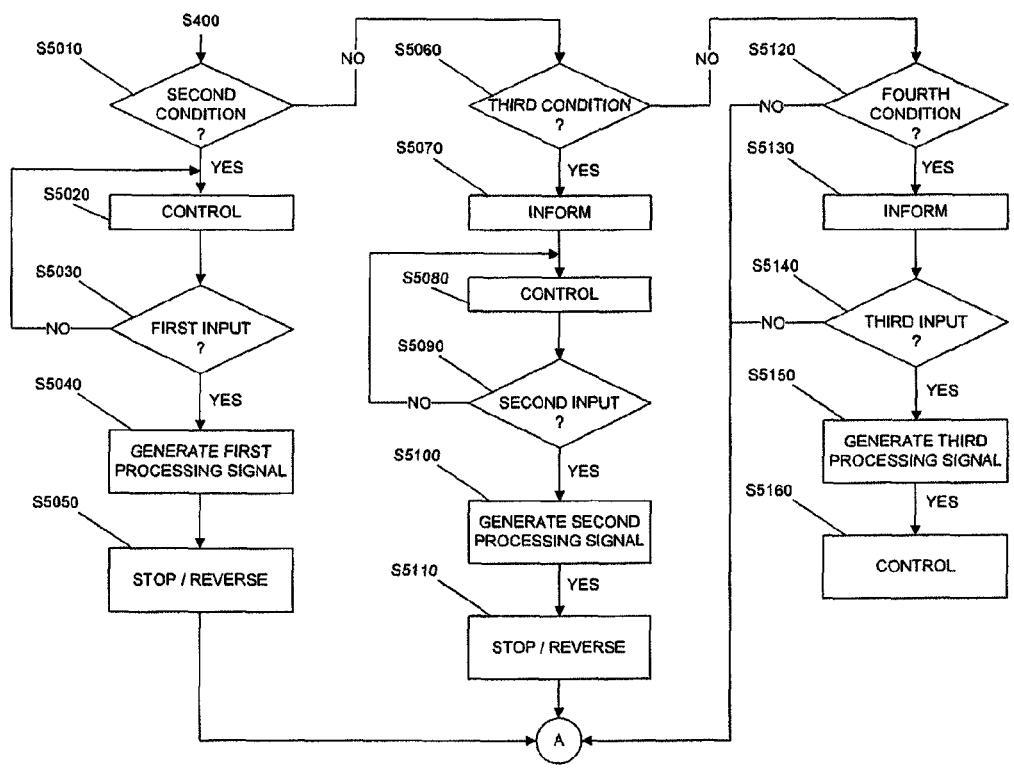
FIG. 4 is a flow chart of a process flow according to a third embodiment of the present invention.

FIG. 4 shows a flow chart of a process according to the third embodiment of the present invention.

It should be noted that the third embodiment of the present invention has additions compared to both the first and second embodiments of the present invention and, with exception of the additions and/or changes described below regarding assembly and functional principle, it is the same as that of the first or second embodiments of the present invention described above, and so redundant description is omitted.

In more detail, a corresponding functional unit can additionally be selected by a speech signal from the vehicle passenger 14. This speech signal can be identified, for example, by the microphone 28 located in the passenger compartment 12 of the vehicle 10. Controlling or setting a functional unit can likewise be stopped or reversed by an appropriate speech signal. To this end, corresponding words such as, for example, the word "stop" are stored in the data memory. The appropriate words are compared with the speech signal of the vehicle passenger 14.

Selecting the functional unit of the vehicle 10 can be confirmed by the vehicle passenger 14 with a speech signal.

The vehicle passenger 14 can be informed of the functional unit selected. To this end, for example, the loudspeaker 30 can be used which is located in the passenger compartment 12 of the vehicle 10.

The functionality described above is described in detail with reference to FIG. 4.

As is obvious from FIG. 4, the process flow shown there is arranged after step S400 of the process flow in FIG. 2 or FIG. 3 and replaces step S500 of the process flow in FIG. 2 or FIG. 3. This means that after selecting a particular functional unit at step S400 in FIG. 2 or FIG. 3, the following further process flow is carried out.

At step S5010, a check is made as to whether or not a second predetermined condition is fulfilled. In more detail, the second predetermined condition is fulfilled if recognition reliability of the gesture detected at step S200 of FIG. 2 or FIG. 3 is above a first predetermined threshold. The first predetermined threshold is defined such that a recognition reliability above it indicates that a gesture has been extremely surely or reliably recognized. Recognition should be understood as meaning that a gesture is detected, compared with movement patterns stored in the data memory, and a processing result indicative of the comparison result is outputted.

If the decision at step S5010 is YES, that means the recognition reliability of the detected gesture is high enough to assume that the gesture is correctly detected, process flow proceeds to step S5020. At step S5020 the particular selected functional unit is controlled. That means that step S5020 corresponds to step S500 in the process flow in FIG. 2 or FIG. 3. After step S5020, step S5030 is carried out, in which a check is made as to whether or not a first predetermined speech input has been carried out by the vehicle passenger 14, for example via the microphone 28. The first predetermined speech input is a speech input such as e.g. "stop", which serves to stop or reverse controlling the functional unit controlled at step S5020. If the decision at step S5030 is NO, then the process flow returns to step S5020. That means that controlling the controlled functional unit is continued.

If the decision at step S5030 is YES, then the process flow proceeds to step S5040. At step S5040, a first predetermined processing signal is generated in response to the first predetermined speech input that serves to indicate stopping or reversing controlling the controlled functional unit. After step S5040, step S5050 is carried out. At step S5050, the controlled functional unit is controlled based on the first predetermined processing signal to stop or reverse controlling the functional unit carried out before.

After step S5050, the process flow returns to the entry point A of the process flow in FIG. 2 or FIG. 3.

If a decision NO is made at step S5010, then the process flow continues to step S5060. At step S5060, a check is made as to whether or not a third predetermined condition is fulfilled.

In more detail, the third predetermined condition is fulfilled if the recognition reliability of the gesture detected at step S200 of FIG. 2 or FIG. 3 is below the first predetermined threshold and above a second predetermined threshold, which is smaller than the first predetermined threshold. This second predetermined threshold is defined such that recognition reliability above indicates that a gesture has been recognized with a large probability, but recognition reliability is below the recognition reliability that is given by exceeding the first predetermined threshold. Recognition should be understood as meaning that a gesture is detected, compared with movement patterns stored in the data memory, and a processing result indicative of the comparison result is outputted.

If the decision at step S5060 is YES, that means the recognition reliability of the detected gesture is high enough to assume that the gesture has been correctly recognized, the process flow proceeds to step S5070. At step S5070, the vehicle passenger 14 is informed of controlling the selected functional unit before the selected functional unit is controlled. In more detail, the vehicle passenger 14 is informed of the selected functional unit that is to be subsequently controlled with some advanced warning before the selected functional unit is controlled.

After step S5070, step S5080 is carried out. At step S5080, the particular selected functional unit is controlled after the advanced warning from step S5070. That means that step S5080 corresponds to step S500 in the process flow in FIG. 2 or FIG. 3. After step S5080, step S5090 is carried out, in which a check is made as to whether or not a second predetermined speech input has been carried out by the vehicle passenger 14, for example via the microphone 28. The second predetermined speech input is a speech input such as e.g. "stop", which serves to stop or reverse controlling of the functional unit controlled at step S5080. If the decision at step S5090 is NO, then the process flow returns to step S5080. That means that controlling the controlled functional unit is continued.

If the decision at step S5090 is YES, then the process flow continues to step S5100. At step S5100, a second predetermined processing signal is generated in response to the second predetermined speech input, a signal that serves to indicate stopping or reversing controlling of the controlled functional unit. After step S5100, step S5110 is carried out. At step S5110, the controlled functional unit is controlled based on the second predetermined processing signal to stop or reverse controlling the functional unit carried out before.

After step S5110, the process flow returns to the entry point A of the process flow in FIG. 2 or FIG. 3.

If a decision NO is made at step S5060, then the process flow continues to step S5120. At step S5120, a check is made as to whether or not a fourth predetermined condition is fulfilled.

In more detail, the fourth predetermined condition is fulfilled if the recognition reliability of the gesture detected at step S200 of FIG. 2 or FIG. 3 is equal to or below a third predetermined threshold. This third predetermined threshold is defined such that recognition reliability above indicates that a gesture is recognized with probability, but the recognition reliability is below the recognition reliability that is given by exceeding the second predetermined threshold. Recognition should be understood as meaning that a gesture is detected, compared with movement patterns stored in the data memory, and a process result indicative of the comparison result is outputted.

If the decision at step S5120 is YES that means the recognition reliability of the detected gesture is high enough to assume that the gesture has been correctly recognized, the process flow proceeds to step S5130. At step S5130, the vehicle passenger 14 is informed that a question is being asked about whether or not he wants to control the selected functional unit, without controlling the selected functional unit. After step S5130, step S5140 is carried out, in which a check is made as to whether or not a third predetermined speech input has been carried out by the vehicle passenger 14, for example via the microphone 28. This third predetermined speech input is a speech input such as e.g. "activate", which serves to carry out controlling the functional unit selected at step S400 of the process flow in FIG. 2 or FIG. 3. If the decision at step S5140 is NO, then the process flow returns to the entry point A of the process flow in FIG. 2 or FIG. 3. That means, controlling the controlled functional unit is not carried out.

If the decision at step S5140 is YES, then the process flow proceeds to step S5150. At step S5150, in response to the third predetermined speech input, a third predetermined processing signal is generated that serves to indicate controlling the selected functional unit. After step S5150, step S5160 is carried out. At step S5160, the selected functional unit is controlled based on the third predetermined processing signal. That means, step S5160 corresponds to step S500 in the process flow in FIG. 2 or FIG. 3.

After step S5160, the process flow returns to the entry point A of the process flow in FIG. 2 or FIG. 3.

In the manner described above with reference to FIG. 4, a particular selected functional unit can be controlled without further action on the part of the vehicle passenger; if the recognition reliability of a detected gesture is extremely high, the particular selected functional unit can be controlled, wherein the vehicle passenger 14 can stop or reverse controlling if the recognition reliability of the detected gesture indicates extremely probable correct recognition of the detected gesture and the particular selected functional unit can be controlled after the vehicle passenger 14 has confirmed controlling the selected functional unit, if the recognition reliability of the detected gesture does not indicate sufficiently high probability.

It should be noted that at steps S500, S5020, S5080 and S5160 control is carried out until the controlled functional unit has fully carried out its function and/or until an detected gesture is no longer carried out by the vehicle passenger 14, unless the condition of one of the steps S5030 and S5090 is fulfilled. Although not shown in FIG. 4, the process flow returns to the entry point A in FIG. 2 or FIG. 3 after completing function of the controlled functional unit and/or after the detected gesture is no longer carried out by the vehicle passenger 14.

The process flow of steps S5130 and S5140 can advantageously be used to carry out supervised learning in which the reliability of recognizing gestures is improved by adapting particular parameters upon checking whether the second, third or fourth condition has been fulfilled or not.

Furthermore or alternatively, recognizing and processing gestures can be carried out not only for a driver, but also equally for others or all vehicle passengers in the vehicle 10, to thereby omit not only control elements for the driver, but also equally omit control elements for the others or all vehicle passengers in the vehicle can be.

There is the possibility of carrying out several of the process flows described above with reference to FIG. 2, FIG. 3 and FIG. 4 in parallel with each other to allow parallel processing of several gestures carried out at the same time which are carried out by a vehicle passenger or different vehicle passengers as necessary.

It should be noted that the assembly of the detecting means 18, the microphone 28 and the loudspeaker 30 shown in FIG. 1 can be freely chosen and merely serve for illustration. The detecting means 18 is preferably to be arranged such that it can detect gestures by vehicle passengers 14 in all the seats of a vehicle 10. To this end, several detecting means 18 can also be used if necessary. The microphone 28 or a plurality of microphones have to be arranged in the passenger compartment 12 of the vehicle 10 such that they can detect the speech signals or speech input of the vehicle passenger 14 or of several vehicle passengers 14 separately from each other.

As an example of a gesture-based control by the previous process flows, a window of a vehicle can be opened by the vehicle passenger making a downward movement with an outstretched, flat hand. The movement sequence of the gesture in this case has a similarity to the movement of a window opening. Another possibility consists in the gesture being analogous to a direct manipulation of the desired functional unit. For example, the exterior mirror of a vehicle can be set by moving an outstretched index finger in the direction of a corner of the exterior mirror as if the exterior mirror itself were being set mechanically with the finger. Through this gesture, the exterior mirror is deviated in the direction of this corner.

Such class of gestures having a relation of similarity to the action that is to be carried out by the gesture, or which are analogous to a direct manipulation of the object, are called "iconic" gestures. Iconic gestures offer the advantage that they do not, as a rule, have to be extensively learned by the vehicle passenger, but rather are intuitive.

In the passenger compartment of the vehicle, an essentially stable and controlled environment is given. The position of the vehicle passenger can only be changed within predetermined boundaries and the range of the movements and hence the space in which the gestures can be detected is likewise limited. Due to these limitations the gestures are easier to detect.

To detect the gestures of the vehicle passenger, known sensors or detecting means can be used (for example), such as are used in consumer or gaming products. Due to this the number of control elements in a vehicle can be clearly reduced and operation can be made easier for vehicle passengers. Gestures both from the driver and from other passengers in the passenger-side seat and/or in the rear seats can be detected.

It should be noted that, instead of the gestures described in each of the previously described embodiments, which have a movement sequence that corresponds to a movement pattern that is similar to a movement of a functional unit to be controlled or is analogous to a manipulation of the functional unit to be controlled, a gesture that indicates a functional unit to be controlled can be used, together with a possibly redundant speech indication that serves to select a function of the functional unit to be controlled. This can be also applied in addition to the functionality in each of the embodiments described above. An example for this is pointing to the exterior mirror and making an input of the speech instruction "fold in" to control the exterior mirror such that it folds in.

The embodiments of the present invention described above can be implemented as a computer program product, such as e.g. a storage media, which in combination with a computer or several computers, i.e. computer systems or computer networks or other processing units, is adapted to carry out a method according to the previous embodiments. The computer program product can be adapted to carry out the method only after carrying out a predetermined routine, such as e.g. a setup routine.

Although the present invention has been described above on the basis of embodiments, it is understood that various modifications and changes can be carried out without departing from the scope of the present invention as defined in the appended claims.

With regards to further features and advantages of the present invention, explicit reference is made to the disclosure of the drawing.

The invention claimed is:

1. A method for controlling a functional unit of a vehicle, comprising:
   detecting a gesture of a vehicle passenger;
   controlling a functional unit depending on the detected gesture if a first predetermined condition is fulfilled,
   wherein the first predetermined condition is that a movement sequence of the detected gesture coincides with a predetermined movement pattern that is similar to a movement of the functional unit to be controlled or is analogous to a manipulation of the functional unit to be controlled;
   generating a first predetermined processing signal in response to a first predetermined speech input of the vehicle passenger, if a second predetermined condition is fulfilled; and
   stopping or reversing controlling the functional unit to be controlled in response to the first predetermined processing signal,
   wherein the second predetermined condition is that recognition reliability of the detected gesture is above a first predetermined threshold.

2. A method for controlling a functional unit of a vehicle, comprising:
   detecting a gesture of a vehicle passenger;
   controlling a functional unit depending on the detected gesture if a first predetermined condition is fulfilled,
   wherein the first predetermined condition is that a movement sequence of the detected gesture coincides with a predetermined movement pattern that is similar to a movement of the functional unit to be controlled or is analogous to a manipulation of the functional unit to be controlled;
   generating a first predetermined processing signal in response to a first predetermined speech input of the vehicle passenger, if a second predetermined condition is fulfilled;
   stopping or reversing controlling the functional unit to be controlled in response to the first predetermined processing signal;
   informing the vehicle passenger of the functional unit to be controlled after selecting and before controlling the functional unit to be controlled, if a third predetermined condition is fulfilled;
   generating a second predetermined processing signal in response to a second predetermined speech input of a vehicle passenger after informing the vehicle passenger; and
   stopping or reversing controlling the functional unit to be controlled in response to the second predetermined processing signal.

3. The method according to claim 2, wherein the third predetermined condition is that the recognition reliability of the detected gesture is below the first predetermined threshold and above a second predetermined threshold, which is smaller than the first predetermined threshold.

4. The method according to claim 2, further comprising:
   informing the vehicle passenger of the functional unit to be controlled, after selecting and before controlling the functional unit to be controlled, if a fourth predetermined condition is fulfilled;
   generating a third predetermined processing signal in response to a third predetermined speech input of a vehicle passenger after informing the vehicle passenger; and
   performing controlling the functional unit to be controlled in response to the third predetermined processing signal.

5. The method according to claim 4, wherein the fourth predetermined condition is that recognition reliability of the detected gesture is below a third predetermined threshold, which is smaller than or equal to the second predetermined threshold.

6. A non-transitory computer-readable medium storing instructions, which when executed by a computer cause the computer to:
  detect a gesture of a vehicle passenger;
  control a functional unit depending on the detected gesture if a first predetermined condition is fulfilled,
    wherein the first predetermined condition is that a movement sequence of the detected gesture coincides with a predetermined movement pattern that is similar to a movement of the functional unit to be controlled or is analogous to a manipulation of the functional unit to be controlled;
  generate a first predetermined processing signal in response to a first predetermined speech input of the vehicle passenger, if a second predetermined condition is fulfilled; and
  stopping or reversing controlling the functional unit to be controlled in response to the first predetermined processing signal,
    wherein the second predetermined condition is that recognition reliability of the detected gesture is above a first predetermined threshold.

7. A non-transitory computer-readable medium storing instructions, which when executed by a computer cause the computer to:
  detect a gesture of a vehicle passenger;
  control a functional unit depending on the detected gesture if a first predetermined condition is fulfilled,
    wherein the first predetermined condition is that a movement sequence of the detected gesture coincides with a predetermined movement pattern that is similar to a movement of the functional unit to be controlled or is analogous to a manipulation of the functional unit to be controlled;
  generate a first predetermined processing signal in response to a first predetermined speech input of the vehicle passenger, if a second predetermined condition is fulfilled;
  stopping or reversing controlling the functional unit to be controlled in response to the first predetermined processing signal;
  inform the vehicle passenger of the functional unit to be controlled after selecting and before controlling the functional unit to be controlled, if a third predetermined condition is fulfilled;
  generate a second predetermined processing signal in response to a second predetermined speech input of a vehicle passenger after informing the vehicle passenger; and
  stop or reverse controlling the functional unit to be controlled in response to the second predetermined processing signal.

8. The non-transitory computer-readable medium according to claim 7, wherein the third predetermined condition is that the recognition reliability of the detected gesture is below the first predetermined threshold and above a second predetermined threshold, which is smaller than the first predetermined threshold.

9. The non-transitory computer-readable medium according to claim 7, further comprising instructions, which when executed by the computer cause the computer to:
  inform the vehicle passenger of the functional unit to be controlled, after selecting and before controlling the functional unit to be controlled, if a fourth predetermined condition is fulfilled;
  generate a third predetermined processing signal in response to a third predetermined speech input of a vehicle passenger after informing the vehicle passenger; and
  performing controlling the functional unit to be controlled in response to the third predetermined processing signal.

10. The non-transitory computer-readable medium according to claim 9, wherein the fourth predetermined condition is that recognition reliability of the detected gesture is below a third predetermined threshold, which is smaller than or equal to the second predetermined threshold.

* * * * *